United States Patent
Park et al.

(10) Patent No.: US 9,015,451 B2
(45) Date of Patent: Apr. 21, 2015

(54) PROCESSOR INCLUDING A CACHE AND A SCRATCH PAD MEMORY AND MEMORY CONTROL METHOD THEREOF

(75) Inventors: Il Hyun Park, Yongin-si (KR); Soojung Ryu, Cheonan-si (KR); Dong-Hoon Yoo, Seoul (KR); Dong Kwan Suh, Uiwang-si (KR); Jeongwook Kim, Seongnam-si (KR); Choon Ki Jang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1202 days.

(21) Appl. No.: 12/048,658

(22) Filed: Mar. 14, 2008

(65) Prior Publication Data

US 2009/0119456 A1  May 7, 2009

(30) Foreign Application Priority Data

Nov. 6, 2007  (KR) .................. 10-2007-0112852

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2006.01) | |
| G06F 9/38 | (2006.01) | |

(52) U.S. Cl.
CPC .............. *G06F 9/3824* (2013.01); *G06F 9/383* (2013.01); *G06F 9/3885* (2013.01)

(58) Field of Classification Search
None
See application file for complete search history.

(56) References Cited

U.S. PATENT DOCUMENTS

| | | | | |
|---|---|---|---|---|
| 5,603,050 A | * | 2/1997 | Wolford et al. | .................... 710/1 |
| 5,845,321 A | * | 12/1998 | Ito et al. | ........................ 711/118 |
| 5,966,734 A | * | 10/1999 | Mohamed et al. | ............ 711/173 |
| 6,401,187 B1 | * | 6/2002 | Motokawa et al. | ........... 711/213 |
| 2001/0037432 A1 | * | 11/2001 | Hotta et al. | .................... 711/129 |
| 2006/0152983 A1 | | 7/2006 | Johnson et al. | |

FOREIGN PATENT DOCUMENTS

| | | |
|---|---|---|
| JP | 09-223068 | 8/1997 |
| JP | 2007-257408 | 10/2007 |
| KR | 10-2000-0052418 | 8/2000 |
| KR | 10-2004-0054936 | 3/2004 |

OTHER PUBLICATIONS

Yoaz et al. (Speculation Techniques for Improving Load Related Instruction Scheduling, May 1999, pp. 42-53).*

Grun et al. (Memory aware compilation through accurate timing extraction, Jul. 2000, pp. 316-321).*

* cited by examiner

*Primary Examiner* — George Giroux
(74) *Attorney, Agent, or Firm* — NSIP Law

(57) ABSTRACT

A processor and a memory management method are provided. The processor includes a processor core, a cache which transceives data to/from the processor core via a single port, and stores the data accessed by the processor core, and a Scratch Pad Memory (SPM) which transceives the data to/from the processor core via at least one of a plurality of multi ports.

20 Claims, 7 Drawing Sheets

PROCESSOR INCLUDING A CACHE AND A SCRATCH PAD MEMORY AND MEMORY CONTROL METHOD THEREOF

CROSS-REFERENCE TO RELATED APPLICATION

This application claims the benefit under 35 U.S.C. §119 (a) of a Korean Patent Application No. 10-2007-0112852, filed on Nov. 6, 2007, in the Korean Intellectual Property Office, the entire disclosure of which is incorporated herein by reference.

TECHNICAL FIELD

Methods and apparatuses consistent with the following description relate to a memory system configuring a computer system, and more particularly, to a memory temporarily storing data based on a calculation of a processor core, a processor architecture including the memory, and a memory control method.

BACKGROUND

A cache memory is provided to efficiently use a memory in a computer system. Typically, it is a memory which is located between a processor core and a main memory, operates more quickly than the main memory, and is smaller than the main memory.

Since data accessed by the processor core generally has a strong possibility of being accessed again soon, the data accessed by the processor core may be stored in the cache memory and may be quickly accessed when an access request occurs again.

In this instance, when the data requested by the processor core is stored in the cache memory, the processor core may quickly access the data requested from the cache memory instead of the main memory, thereby reducing an operation time.

Conversely, when the data requested by the processor core is not stored in the cache memory, the processor core needs to access the data requested from the main memory instead of the cache memory, and a time required for this process may be longer than a time required for accessing the data from the cache memory.

As described above, a case where the data requested by the processor core is stored in the cache memory denotes that a cache hit occurs, and a case where the data requested by the processor core is not stored in the cache memory denotes that a cache miss occurs.

A Scratch Pad Memory (SPM) may used as a memory device being combined with the processor core and storing the data.

The SPM may exclude an additional circuit for determining either a hit or a miss, different from that of the cache memory, and is controlled by legacy software for correct operation of the SPM.

Selection, configuration, and use of at least one of a cache and the SPM may be different according to a processor architecture.

Accordingly, there is a need for a processor architecture including a cache and a SPM, enabling correct operations of the cache and the SPM, and a memory control method.

SUMMARY

According to an aspect, there is provided a processor architecture enabling correct operation in a memory system including a cache and a Scratch Pad Memory (SPM).

According to another aspect, there is provided a processor architecture including a hybrid memory appropriate for a computer architecture in which processing of multiple load/store operations is needed.

According to still another aspect, there is provided a processor including a processor core, a cache which transceives data to/from the processor core via a single port, and stores the data accessed by the processor core, and an SPM which transceives the data to/from the processor core via at least one of a plurality of multi ports.

According to yet another aspect, there is provided a memory control method of a processor including a processor core, a single port cache, and a multi-port SPM, the method including analyzing a characteristic of at least one of a load instruction and a store instruction executed in the processor core, allocating the at least one of the load instruction and the store instruction to any one of the single port cache and the multi-port SPM based on the analyzed characteristic, and processing the at least one of the allocated load instruction and the allocated store instruction.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

Figure 1:
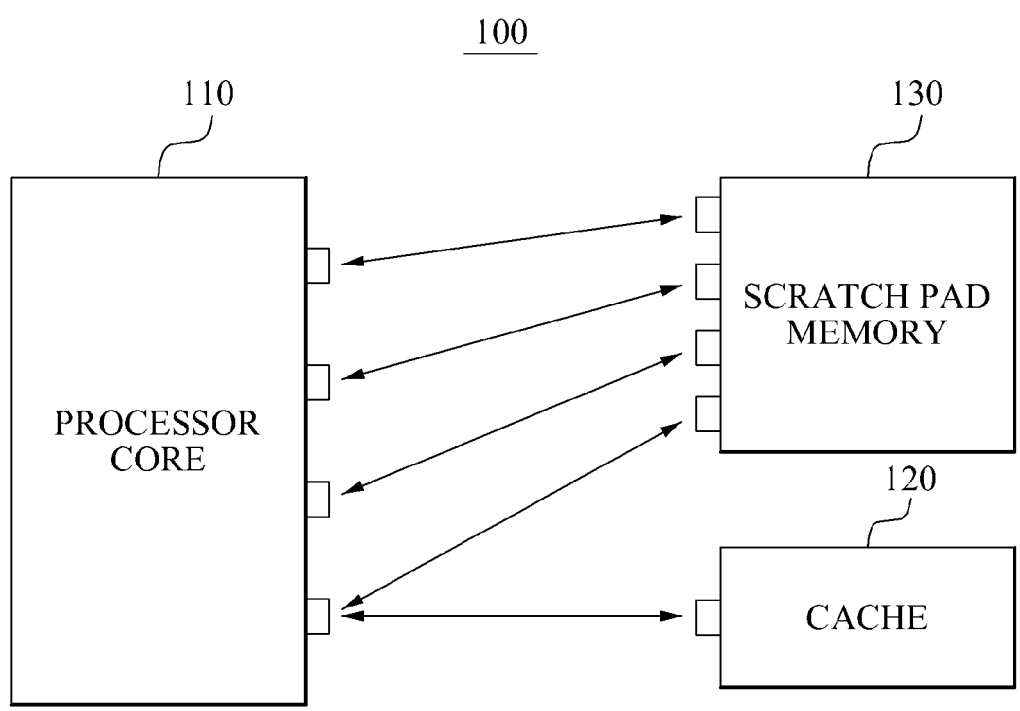
FIG. 1 illustrates a processor according to an exemplary embodiment.

The following detailed description is provided to assist the reader in gaining a comprehensive understanding of the methods and apparatuses described herein. Accordingly, various changes, modifications, and equivalents of the apparatuses and methods described herein will be suggested to those of ordinary skill in the art. Also, descriptions of well-known functions and constructions are omitted to increase clarity and conciseness.

According to an aspect, there is provided a hardware and/or software method and apparatus for efficiently operating a data memory system of a hybrid form. According to another aspect, suitable operation of the data memory system of the hybrid form may be performed with minimum complexity.

In order to increase an instruction processing speed of a processor, a processor architecture simultaneously processing a plurality of instructions in parallel may be used. At least one of a load instruction and a store instruction may need to be processed in parallel in a parallel processor. Accordingly, the parallel processor may include a plurality of units processing the at least one of the load instruction and the store instruction, and a memory apparatus may include a plurality of ports for processing a plurality of load instructions and/or a plurality of store instructions in parallel.

According to still another aspect, there is provided a processor and a memory system which efficiently process data via a combination of a multi-port memory and a single port memory.

A cache memory may be utilized for efficiently using a memory in a computer system, and is a memory which may be located between a processor core and a main memory, operate more quickly than the main memory, and be smaller than the main memory.

Since the data accessed by the processor core generally has a strong possibility of being accessed again soon, the data accessed by the processor core may be stored in the cache memory and may be quickly accessed when an access request occurs again.

In this instance, when the data requested by the processor core is stored in the cache memory, the processor core may quickly access the data requested from the cache memory instead of the main memory, thereby reducing an operation time.

The cache memory may include a tag memory storing a portion of an address on the main memory of the stored data.

Since the cache memory has a complex configuration in a hardware aspect, the cache memory may be inappropriate as the multi-port memory. Also, since a policy of eviction may not be easily determined when a cache miss is generated in a specific port, the cache memory may be inappropriate as the multi-port memory. Accordingly, a processor architecture using a single port cache memory is proposed.

A Scratch Pad Memory (SPM) may be provided besides the cache memory as a memory architecture storing the data processed by the processor. Since the SPM has a simple hardware configuration, the SPM may be appropriate as the multi-port memory. Since the SPM excludes an internal control circuit and the like, control of the SPM may be performed via software. The software is used to determine scheduling of the SPM, manage the SPM, and store necessary data in the SPM in order to store the data necessary at runtime in the SPM.

Also, since a multi-port SPM may have architecture more complex than a single port SPM, the multi-port SPM may require a relatively longer time for processing the data. Accordingly, a data latency of the multi-port SPM may be high.

A high data latency may or may not be permitted based on a type of instructions executed in the processor.

Also, the at least one of the load instruction and the store instruction does not always need to be processed in parallel in the parallel processor. Accordingly, a single port cache having a low data latency may be more efficient than the multi-port SPM having the high data latency based on a characteristic of the at least one of the load instruction and the store instruction.

For suitably controlling the single port cache memory and the multi-port SPM, there is provided a processor and a memory system including the single port cache memory and the multi-port SPM, and a memory management method.

According to yet another aspect, there is provided a memory management method for suitably controlling each of the single port cache memory and the multi-port SPM based on a latency of each of the single port cache memory and the multi-port SPM.

FIG. 1 illustrates a processor 100 according to an exemplary embodiment.

Referring to FIG. 1, the processor 100 includes a processor core 110, a cache 120, and an SPM 130.

The processor core 110 processes a plurality of instructions in parallel.

The cache 120 transceives data to/from the processor core 110 via a single port, and stores the data accessed by the processor core 110.

The SPM 130 includes a plurality of multi ports, and transceives the data to/from the processor core 110 via any one of the plurality of multi ports.

At least one of a load instruction and a store instruction executed in the processor core 110 is allocated to any one of the cache 120 and the SPM 130.

Depending on exemplary embodiments, a compiler may allocate the at least one of the load instruction and the store instruction to any one of the cache 120 and the SPM 130. The compiler may analyze a characteristic of the at least one of the load instruction and the store instruction, and allocate the at least one of the load instruction and the store instruction to any one of the cache 120 and the SPM 130 based on the analyzed characteristic.

When which memory of the cache 120 and the SPM 130 the at least one of the load instruction and the store instruction executed in the processor core 110 is allocated to is undetermined while compiling, the at least one of the load instruction and the store instruction is allocated to the cache 120.

Depending on exemplary embodiments, when which memory of the cache 120 and the SPM 130 the at least one of the load instruction and the store instruction is allocated to is undetermined while compiling, the compiler may allocate the at least one of the load instruction and the store instruction to the cache 120.

Depending on exemplary embodiments, the compiler may determine a latency value of each of the allocated load instruction and the allocated store instruction based on which of the cache 120 and the SPM 130 each of the load instruction and the store instruction is allocated to.

The cache 120 having a single port has a latency lower than the SPM 130 having a multi port.

For example, a latency of the cache 120 may be one, and a latency of the SPM 130 may be four. In this instance, the at least one of the load instruction and the store instruction allocated to the cache 120 has the latency of one, and the at least one of the load instruction and the store instruction allocated to the SPM 130 has the latency of four.

The compiler may determine scheduling of each of the allocated load instruction and the allocated store instruction based on the determined latency value.

The SPM 130 assigns a time stamp value to each of the load instruction and the store instruction allocated to the SPM 130, and reduces, by one, the time stamp value for each clock cycle.

The cache 120 selects any one of the load instruction and the store instruction to be forwarded to the SPM 130 based on an address indicated by each of the load instruction and the store instruction allocated to the cache 120. The cache 120 assigns a time stamp value to each of the selected load instruction and the selected store instruction, and forwards, to the SPM 130, each of the load instruction and the store instruction to which the time stamp value is assigned.

In this instance, the cache 120 may compare the address indicated by each of the load instruction and the store instruction with a predetermined start address and a predetermined end address. When the address indicated by each of the load instruction and the store instruction is not included between the start address and the end address, the cache 120 may forward the at least one of the load instruction and the store instruction to the SPM 130.

Figure 2:
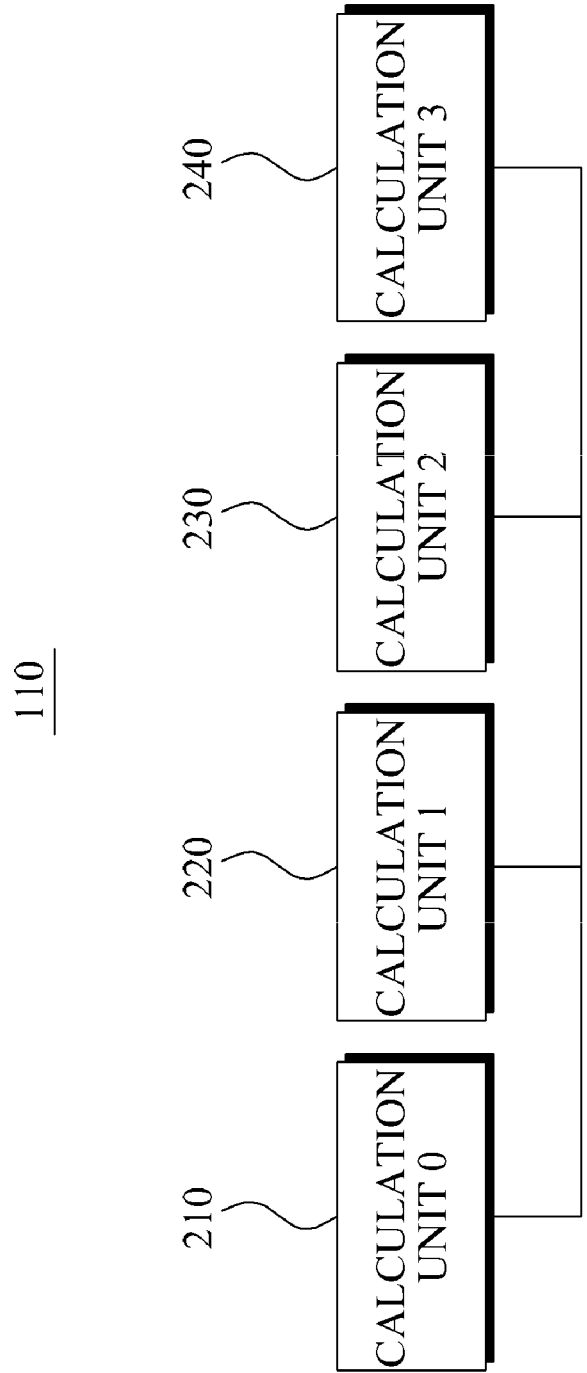
FIG. 2 is a diagram illustrating an example of a processor core of FIG. 1.

FIG. 2 illustrates an example of the processor core 110 of FIG. 1.

Referring to FIG. 2, the processor core 110 includes four calculation units 210, 220, 230, and 240.

Each of the calculation units 210, 220, 230, and 240 may execute an instruction in parallel. Since the processor core 110 includes the four calculation units, the processor core 110 may execute a maximum of four instructions in parallel.

Since the processor core 110 may execute either a maximum of four load instructions or a maximum of four store instructions, the processor core 110 may use four ports.

Figure 3:
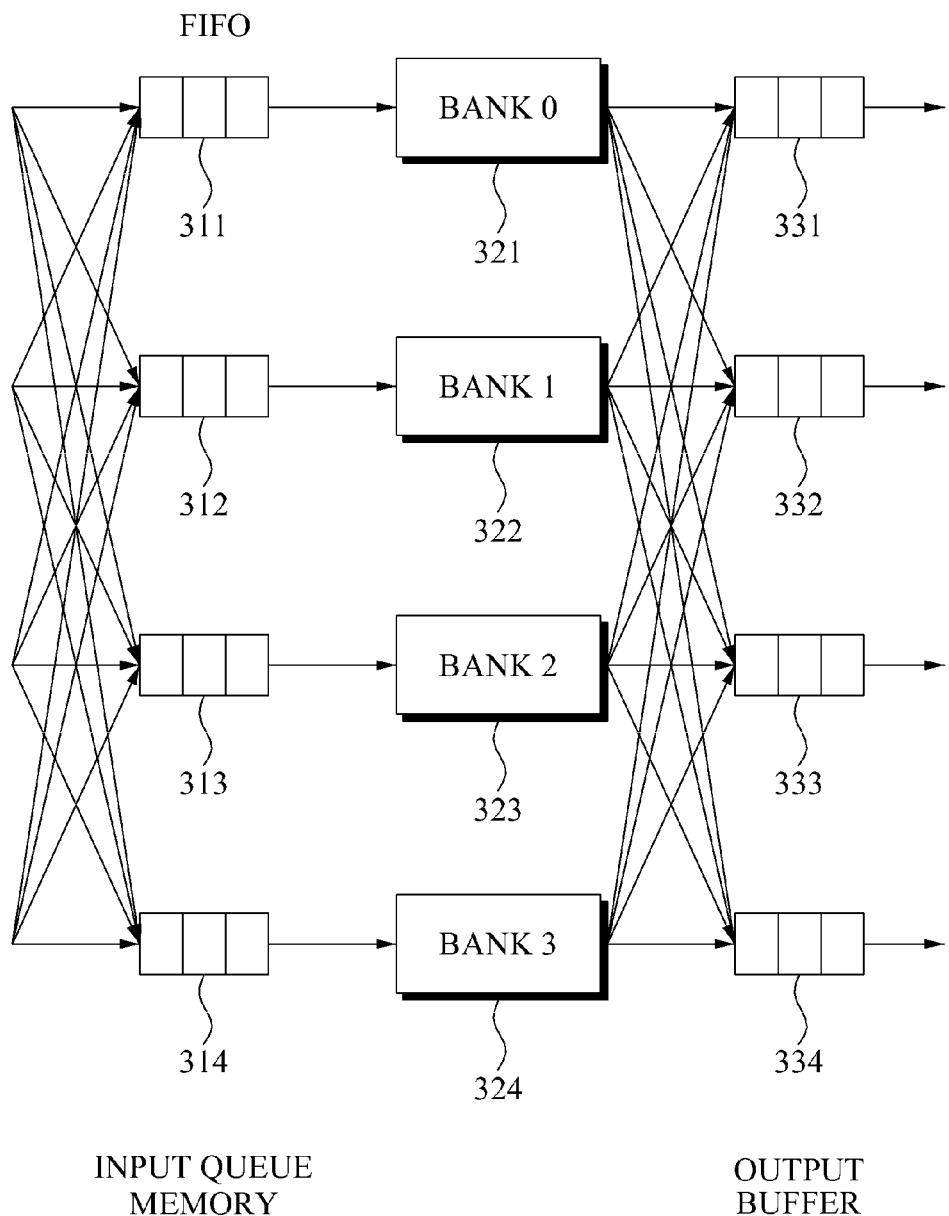
FIG. 3 illustrates an example of a Scratch Pad Memory (SPM) of FIG. 1.

FIG. 3 illustrates an example of the SPM 130 of FIG. 1.

Referring to FIG. 3, the SPM 130 includes four memory banks (0 through 3) 321, 322, 323, and 324. The memory bank (0) 321 is connected with an input queue memory 311 and an output buffer 331.

The input queue memory 311 stores and outputs, using a First In First Output (FIFO) scheme, at least one of a load instruction and a store instruction requested by the processor core 110.

The memory bank (0) 321 processes the at least one of the load instruction and the store instruction received from the input queue memory 311, and forwards a processing result to the output buffer 331.

The output buffer 331 outputs the processing result of the at least one of the processed load instruction and the processed store instruction. The output buffer 331 outputs the processing result based on a latency of each of the processed load instruction and the processed store instruction.

The output buffer 331 outputs the processing result according to a sequence in which a time stamp value of each of the processed load instruction and the processed store instruction is 0.

Similarly, the input queue memories 312, 313, and 314 store and output, using the FIFO scheme, the at least one of the load instruction and the store instruction requested by the processor core 110.

The memory bank (1) 322 processes the at least one of the load instruction and the store instruction received from the input queue memory 312, and forwards a processing result to the output buffer 332. The memory bank (2) 323 processes the at least one of the load instruction and the store instruction received from the input queue memory 313, and forwards a processing result to the output buffer 333. The memory bank (3) 324 processes the at least one of the load instruction and the store instruction received from the input queue memory 314, and forwards a processing result to the output buffer 334.

When a time stamp value of each of the requested load instruction and the requested store instruction is predicted to be 0 while processing each of the requested load instruction and the requested store instruction, the SPM 130 transmits a stall order to the processor core 110. Specifically, when the processing result is expected not to reach the processor core 110 until the time stamp value of each of the requested load instruction and the requested store instruction is 0 while the SPM 130 processes each of the requested load instruction and the requested store instruction, the SPM 130 transmits the stall order to the processor core 110.

For example, when the time stamp value is 1 while each of the load instruction and the store instruction is waiting in the input queue memories 311, 312, 313, and 314, the SPM 130 may transmit the stall order to the processor core 110.

Also, when the time stamp value is 0 while each of the load instruction and the store instruction is processed in the memory banks (0 through 3) 321, 322, 323, and 324, the SPM 130 may transmit the stall order to the processor core 110.

The SPM 130 may transmit the stall order to the processor core 110 based on the time stamp value of each of the load instruction and the store instruction and an architecture of the SPM 130.

Depending on exemplary embodiments, a time of determining when the SPM 130 transmits the stall order may be a time when each of the load instruction and the store instruction is located in the input queue memories 311, 312, 313, and 314, or may be a time when each of the load instruction and the store instruction is processed in the memory banks (0 through 3) 321, 322, 323, and 324, or may be a time when the output buffers 331, 332, 333, and 334 output the processing results.

When the processor core 110 receives the stall order, the processor core 110 waits, stopping an operation until the processing result of each of the load instruction and the store instruction is received.

Depending on exemplary embodiments, a number of memory banks may be different from a number of ports. The number of memory banks may be greater than or equal to the number of ports.

Figure 4:
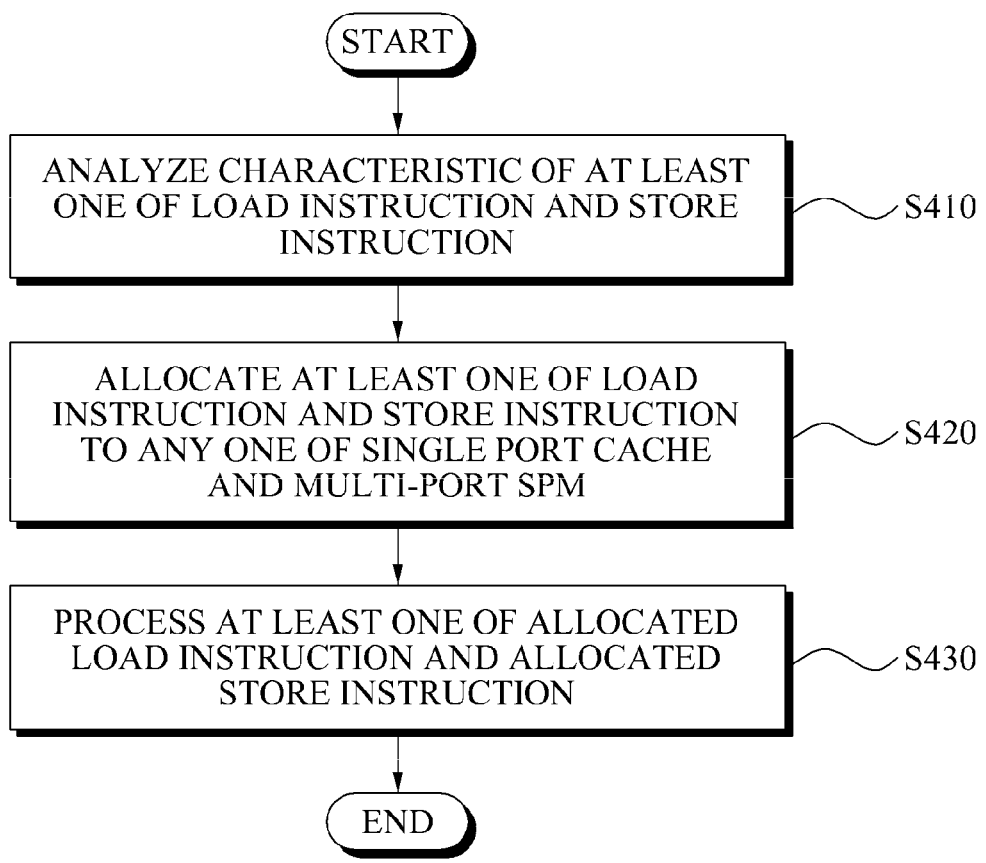
FIG. 4 is a flowchart illustrating a memory management method of the processor of FIG. 1 according to an exemplary embodiment.

FIG. 4 is a flowchart illustrating a memory management method of the processor 100 of FIG. 1 according to an exemplary embodiment.

Referring to FIG. 4, in operation S410, the memory management method analyzes a characteristic of at least one of a load instruction and a store instruction executed in the processor core 110.

In operation S420, the memory management method allocates the at least one of the load instruction and the store instruction to any one of the cache 120 and the SPM 130 based on the analyzed characteristic.

In operation S430, the memory management method processes the at least one of the allocated load instruction and the allocated store instruction.

The cache 120 is a single port memory, and the SPM 130 is a multi-port memory. The cache 120 has a latency lower than a latency of the SPM 130. The memory management method may determine the characteristic of the at least one of the load instruction and the store instruction based on whether a high latency is permitted.

The memory management method may classify the at least one of the load instruction and the store instruction into at least one of a quick load instruction and a quick store instruction based on the analyzed characteristic, and process the at least one of the load instruction and the store instruction. The memory management method may allocate the at least one of the quick load instruction and the quick store instruction to the cache 120.

When the characteristic of the at least one of the load instruction and the store instruction may not be analyzed, the memory management method may temporarily classify the at least one of the load instruction and the store instruction into the at least one of the quick load instruction and the quick store instruction.

The memory management method may use a pointer analysis scheme in order to analyze the characteristic of the at least one of the load instruction and the store instruction. The pointer analysis scheme is a scheme of analyzing the characteristic of each of the load instruction and the store instruction by tracking a pointer of each of the load instruction and the store instruction and tracing an available path in advance.

Figure 5:
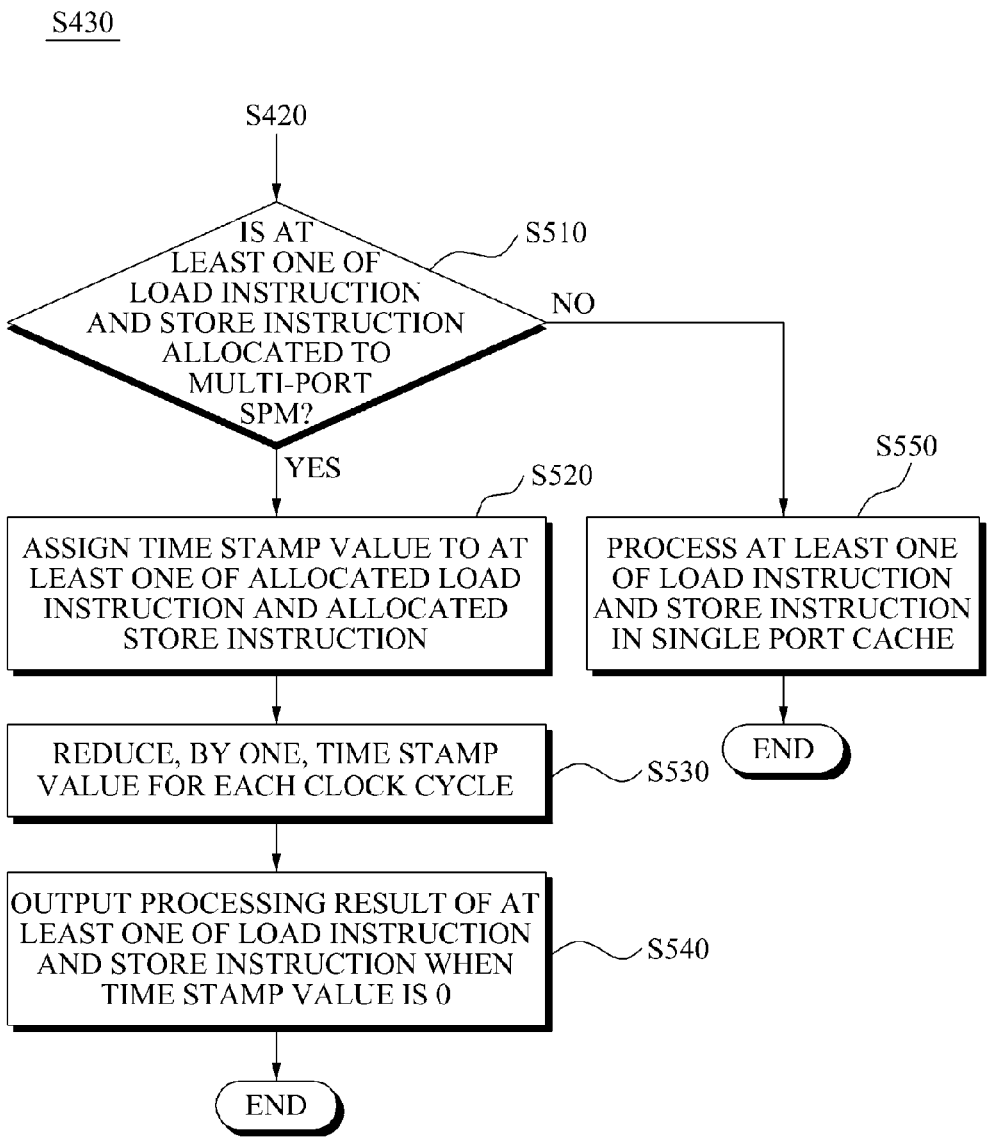
FIG. 5 is a flowchart illustrating an example of operation S430 of FIG. 4.

FIG. 5 is a flowchart illustrating an example of operation S430 of FIG. 4.

Referring to FIG. 5, in operation S510 of operation S430, whether at least one of a load instruction and a store instruction is allocated to the SPM 130 is determined.

In operation S520 of operation S430, a time stamp value is assigned to the at least one of the allocated load instruction and the allocated store instruction when the at least one of the load instruction and the store instruction is allocated to the SPM 130.

In operation S530 of operation S430, the assigned time stamp value is reduced, by one, for each clock cycle.

In operation S540 of operation S430, a processing result of the at least one of the load instruction and the store instruction is outputted when the time stamp value is 0.

In operation S550 of operation S430, the at least one of the allocated load instruction and the allocated store instruction is processed in the cache 120 when the at least one of the load instruction and the store instruction is allocated to the cache 120.

Figure 6:
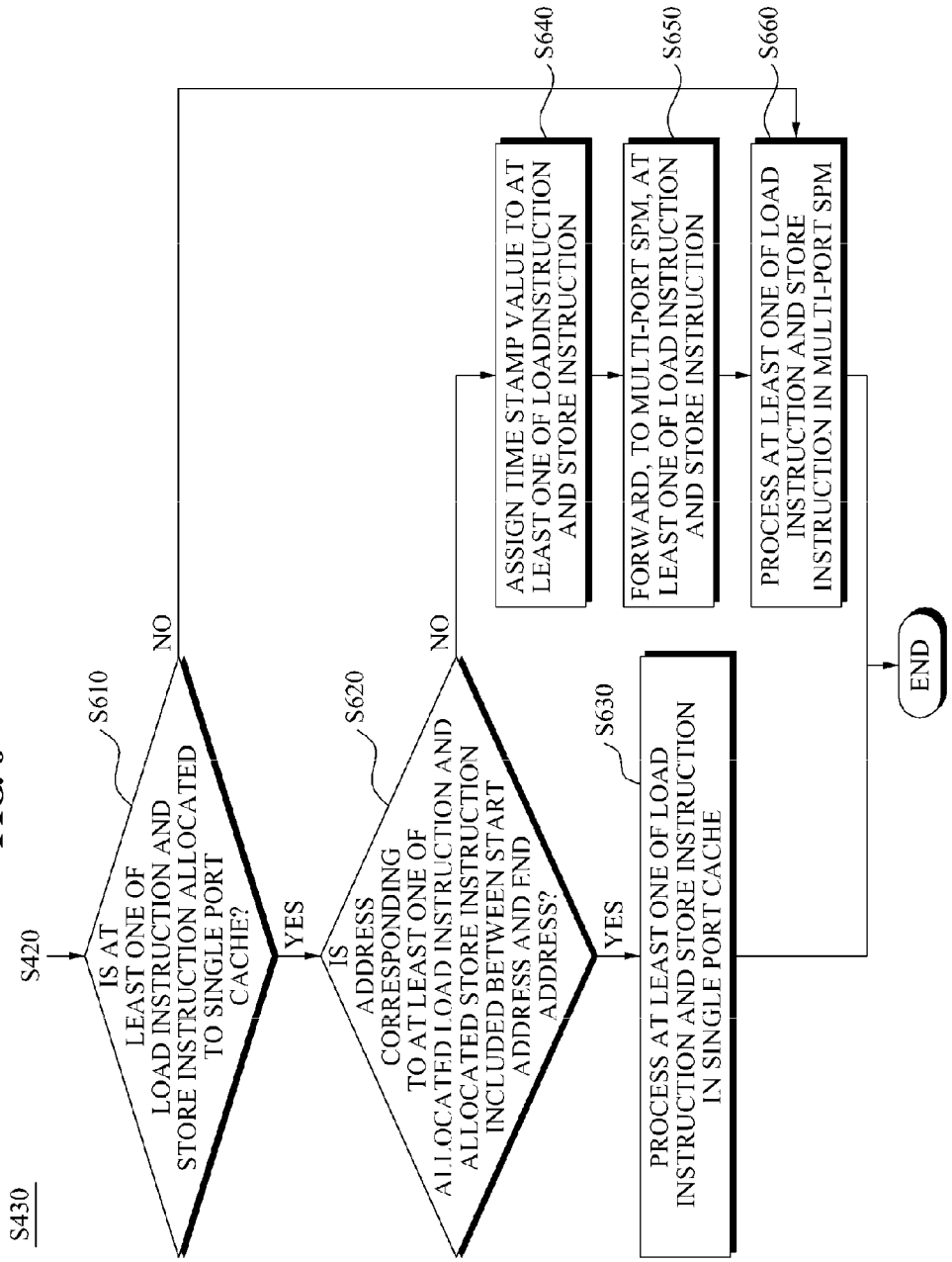
FIG. 6 is a flowchart illustrating another example of operation S430 of FIG. 4.

FIG. 6 is a flowchart illustrating another example of operation S430 of FIG. 4.

Referring to FIG. 6, in operation S610 of operation S430, whether at least one of a load instruction and a store instruction is allocated to the cache 120 is determined.

In operation S620 of operation S430, when the at least one of the load instruction and the store instruction is allocated to the cache 120, whether an address corresponding to the at least one of the allocated load instruction and the allocated store instruction is included between a start address and an end address is determined.

In operation S620, whether to forward, to the SPM 130, the at least one of the load instruction and the store instruction is determined based on whether the address is included between the start address and the end address.

In operation S620, the start address and the end address of the cache 120 may be set. Depending on embodiments, the start address and the end address of the cache 120 may be set in advance.

In operation S630 of operation S430, when the address is included between the start address and the end address, the at least one of the load instruction and the store instruction is processed in the cache 120.

In operation S430, when the address is not included between the start address and the end address, the at least one of the load instruction and the store instruction may be determined to be forwarded to the SPM 130.

In operation S640 of operation S430, when the address is not included between the start address and the end address, a time stamp value is assigned to the at least one of the load instruction and the store instruction.

In operation S650 of operation S430, the at least one of the load instruction and the store instruction to which the time stamp value is assigned is forwarded to the SPM 130.

After operation S650, or when it is determined that the at least one of the load instruction and the store instruction is not allocated to the cache 120 in operation S610, the at least one of the load instruction and the store instruction forwarded to the SPM 130 is processed in the SPM 130 in operation S660 of operation S430.

Depending on exemplary embodiments, in operation S430, the at least one of the allocated load instruction and the allocated store instruction may be stored in any one of the input queue memories 311, 312, 313, and 314 according to a scheduling-determined sequence.

In operation S430, the at least one of the load instruction and the store instruction first stored in the input queue memories 311, 312, 313, and 314 may be processed.

In operation S430, a processing result value of the at least one of the processed load instruction and the processed store instruction may be stored in any one of the output buffers 331, 332, 333, and 334.

In operation S430, the processing result value stored in the output buffers 331, 332, 333, and 334 may be outputted when a time stamp value of the at least one of the processed load instruction and the processed store instruction is 0.

In operation S430, a stall order may be transmitted to the processor core 110 when a time stamp value of the at least one of the first-stored load instruction and the first-stored store instruction is predicted to be 0 while processing the at least one of the first-stored load instruction and the first-stored store instruction.

Specifically, in operation S430, the stall order may be transmitted to the processor core 110 when the processing result is expected not to reach the processor core 110 until the time stamp value of each of the first-stored load instruction and the first-stored store instruction is 0 while processing each of the first-stored load instruction and the first-stored store instruction.

For example, when the time stamp value is 1 while each of the load instruction and the store instruction is waiting in the input queue memories 311, 312, 313, and 314, the stall order may be transmitted to the processor core 110 in operation S430.

Also, when the time stamp value is 0 while each of the load instruction and the store instruction is processed in the memory banks (0 through 3) 321, 322, 323, and 324, the stall order may be transmitted to the processor core 110 in operation S430.

In operation S430, the stall order may be transmitted to the processor core 110 based on the time stamp value of each of the load instruction and the store instruction and an architecture of the SPM 130.

Depending on exemplary embodiments, a time of determining when the stall order is transmitted in operation S430 may be a time when each of the load instruction and the store instruction is located in the input queue memories 311, 312, 313, and 314, or may be a time when each of the load instruction and the store instruction is processed in the memory banks (0 through 3) 321, 322, 323, and 324, or may be a time when the output buffers 331, 332, 333, and 334 output the processing results.

When the processor core 110 receives the stall order, the processor core 110 waits, stopping an operation until the processing result of each of the load instruction and the store instruction is received.

Figure 7:
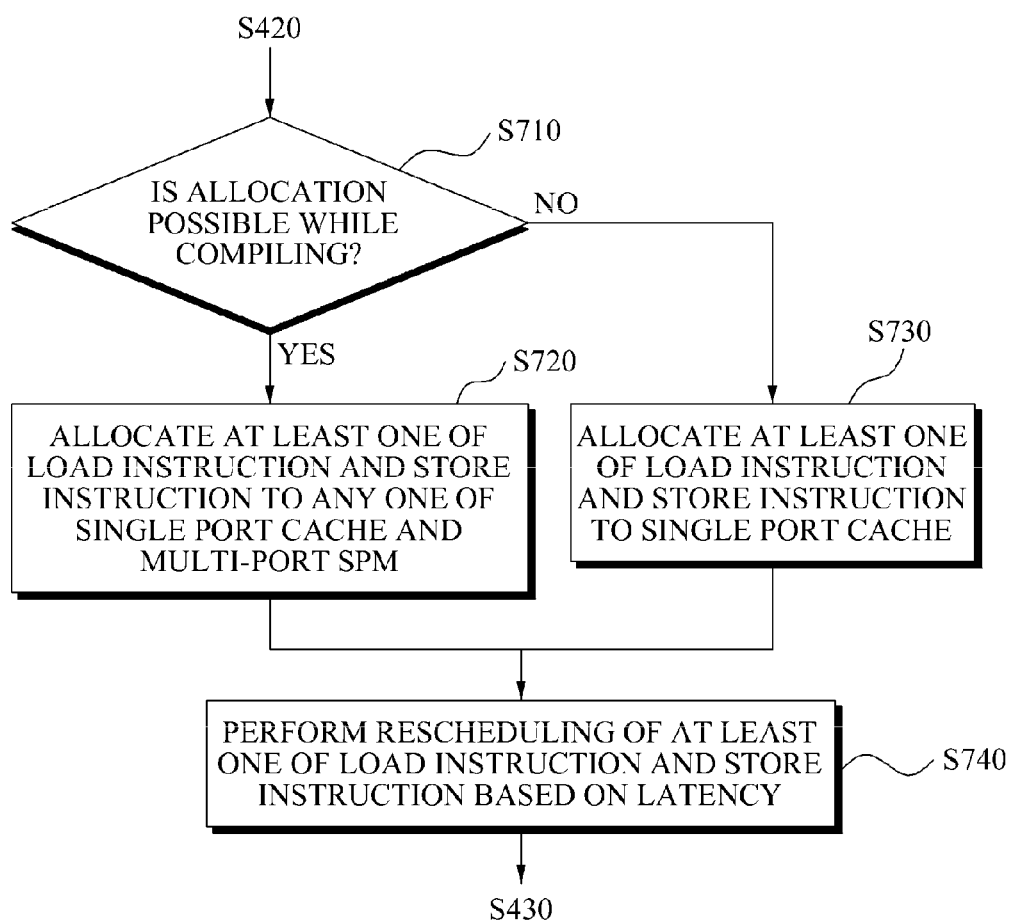
FIG. 7 is a flowchart illustrating a memory management method of the processor of FIG. 1, in detail according to another exemplary embodiment.

FIG. 7 is a flowchart illustrating a memory management method of the processor 100 of FIG. 1, in detail according to another exemplary embodiment.

Referring to FIG. 7, in operation S710, the memory management method determines whether allocation of at least one of a load instruction and a store instruction is possible while compiling after performing operation S420.

In operation S720, when it is determined in operation S710 that allocation is possible, the memory management method allocates the at least one of the load instruction and the store instruction to any one of the cache 120 and the SPM 130 based on an allocation result of operation S420.

In operation S730, when it is determined in operation S710 that allocation is impossible, the memory management method allocates the at least one of the load instruction and the store instruction to the cache 120.

In operation S740, the memory management method performs rescheduling of the at least one of the allocated load instruction and the allocated store instruction based on a latency.

In this instance, since a latency of the cache 120 is lower than a latency of the SPM 130, the at least one of the load instruction and the store instruction allocated to the cache 120 may be executed more quickly than the at least one of the load instruction and the store instruction allocated to the SPM 130.

The memory management method according to the above-described exemplary embodiments may be recorded, stored, or fixed in one or more computer-readable media including program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor comprising:
a processor core;
a cache configured to transceive data to/from the processor core via a single port, and store data accessed by the processor core; and
a Scratch Pad Memory (SPM) configured to transceive data to/from the processor core via a plurality of ports; and
a compiler configured to determine a latency value of the cache and a latency value of the SPM, and to create a schedule of instructions allocated to the cache and the SPM based solely on the determined latency value of the cache and the determined latency value of the SPM.

2. The processor of claim 1, wherein an instruction comprising at least one of a load instruction and a store instruction executed in the processor core is allocated to any one of the cache and the SPM.

3. The processor of claim 2, wherein, in response to it being undetermined while compiling which memory of the cache and the SPM the instruction executed in the processor core is to be allocated, the instruction executed in the processor core is allocated to the cache.

4. The processor of claim 2, wherein a latency value is determined based on which of the cache and the SPM the instruction executed in the processor core is allocated to, and the allocated instruction is scheduled based on the determined latency value.

5. The processor of claim 2, wherein the SPM assigns a time stamp value to an instruction allocated to the SPM, and reduces, by one, the time stamp value for each clock cycle.

6. The processor of claim 2, wherein the cache selects an instruction to be forwarded to the SPM based on an address indicated by the instruction allocated to the cache,
assigns a time stamp value to the selected instruction, and
forwards, to the SPM, the instruction to which the time stamp value is assigned.

7. The processor of claim 1, wherein a latency of the cache is less than a latency of the SPM.

8. The processor of claim 1, wherein the SPM comprises:
an input queue memory which stores, using a First In First Output (FIFO) scheme, an instruction requested by the processor core; and
an output buffer which outputs a processing result of the instruction processed by the SPM based on a latency of the processed instruction.

9. The processor of claim 8, wherein the output buffer outputs the processing result in response to a time stamp value of the processed instruction being 0.

10. The processor of claim 8, wherein, in response to a time stamp value of the instruction being predicted to be 0 while processing the instruction, the SPM transmits a stall order to the processor core.

11. A memory control method of a processor including a processor core, a single port cache, and a multi-port SPM, the method comprising:
analyzing a characteristic of an instruction comprising at least one of a load instruction and a store instruction executed in the processor core;
allocating the instruction to any one of the single port cache and the multi-port SPM based on the analyzed characteristic;
determining a latency value of the single port cache and a latency value of the multi-port SPM;
creating a schedule of the instruction to be processed based solely on the determined latency value of the single port cache and the determined latency value of the multi-port SPM; and
processing the instruction based on the schedule.

12. The method of claim 11, wherein the processing comprises:
assigning a time stamp value to the instruction in response to the instruction being allocated to the multi-port SPM;
reducing, by one, the time stamp value for each clock cycle; and
outputting a processing result of the instruction in response to the time stamp value being 0.

13. The method of claim 11, wherein the processing comprises:
selecting an instruction to be forwarded to the multi-port SPM based on an address corresponding to the instruction; and
assigning a time stamp value to the selected instruction.

14. The method of claim 13, wherein the selecting comprises:
setting a start address and an end address of the single port cache; and
determining whether to forward, to the multi-port SPM, the instruction by comparing the address corresponding to the instruction with the start address and the end address.

15. The method of claim 11, wherein the multi-port SPM includes an output buffer and an input queue memory of a FIFO scheme, and
the processing comprises:
storing, in the input queue memory, the instruction according to a scheduling-determined sequence;
processing the instruction that is first stored in the input queue memory;
storing, in the output buffer, a processing result value of the processed instruction; and
outputting the processing result value stored in the output buffer in response to a time stamp value of the processed instruction being 0.

16. The method of claim 15, wherein the processing of allocated instruction further comprises:
transmitting a stall order to the processor core in response to a time stamp value of the first-stored instruction being predicted to be 0 while an operation of processing the instruction being first stored in the input queue memory is performed.

17. The method of claim 11, wherein, in response to it being undetermined while compiling which memory of the cache and the SPM the instruction executed in the processor core is to be allocated to, the allocating allocates the instruction to the cache.

18. A non-transitory computer-readable recording medium storing a program for implementing a memory control method of a processor including a processor core, a single port cache, and a multi-port SPM, the method comprising:
analyzing a characteristic of an instruction comprising at least one of a load instruction and a store instruction executed in the processor core;
allocating the instruction to any one of the single port cache and the multi-port SPM based on the analyzed characteristic;
determining a latency value of the single port cache and a latency value of the multi-port SPM;
creating a schedule of the instruction based solely on the determined latency value of the single port cache and the determined latency value of the multi-port SPM; and
processing the allocated instruction based on the schedule.

19. The processor of claim 1, wherein the compiler is configured to:
allocate an instruction to the cache and to allocate an instruction to the SPM,
determine a latency value of the instruction allocated to the cache based on the cache,
determine a latency value of the instruction allocated to the SPM based on the SPM, and
creating a schedule of an instruction allocated to the cache and an instruction allocated to the SPM based on the determined latency values.

20. The processor of claim 1, wherein the compiler is configured to create a schedule of an instruction allocated to the cache and an instruction allocated to the SPM based on a difference between the determined latency value of the cache and the determined latency value of the SPM.

* * * * *